United States Patent
Woronowicz et al.

(10) Patent No.: US 9,517,697 B2
(45) Date of Patent: Dec. 13, 2016

(54) PROVIDING A VEHICLE WITH ELECTRIC ENERGY USING A RECEIVING DEVICE ADAPTED TO RECEIVE AN ALTERNATING ELECTROMAGNETIC FIELD

(71) Applicant: Bombardier Transportation GmbH, Berlin (DE)

(72) Inventors: Konrad Woronowicz, Kingston (CA); Robert Czainski, Szczecin (PL)

(73) Assignee: Bombardier Transportation GmbH, Berlin (DE)

(*) Notice: Subject to any disclaimer, the term of this patent is extended or adjusted under 35 U.S.C. 154(b) by 323 days.

(21) Appl. No.: 14/355,968

(22) PCT Filed: Nov. 2, 2012

(86) PCT No.: PCT/EP2012/071770
§ 371 (c)(1),
(2) Date: May 2, 2014

(87) PCT Pub. No.: WO2013/064670
PCT Pub. Date: May 10, 2013

(65) Prior Publication Data
US 2014/0318912 A1    Oct. 30, 2014

(30) Foreign Application Priority Data
Nov. 4, 2011 (GB) .................................. 1119152.5

(51) Int. Cl.
*B60L 5/00* (2006.01)
*B60M 7/00* (2006.01)
(Continued)

(52) U.S. Cl.
CPC ............... *B60L 5/005* (2013.01); *B60M 7/003* (2013.01); *H01F 38/14* (2013.01); *H02J 5/005* (2013.01); *B60L 2200/26* (2013.01)

(58) Field of Classification Search
CPC ............ B61L 5/00; B61L 5/005; B60M 7/00; B60M 7/003; H01F 38/14; H02J 5/005
See application file for complete search history.

(56) References Cited

U.S. PATENT DOCUMENTS 8,508,184 B2 *  8/2013  Sakakibara ............ B60L 5/005
                                                        180/65.1
9,327,602 B2 *  5/2016  Woronowicz ........... B60L 5/005
(Continued)

FOREIGN PATENT DOCUMENTS

CN    1499694 A    5/2004
DE    3237373 A1   5/1983
(Continued)

*Primary Examiner* — Jason C Smith
(74) *Attorney, Agent, or Firm* — The Webb Law Firm

(57) ABSTRACT

An arrangement for providing a vehicle with electric energy, including a receiving device adapted to receive an alternating electromagnetic field and to produce an alternating electric current by magnetic induction, a plurality of phase lines adapted to carry a different phase current of the alternating electric current. Each phase line forms at least two coils. Each coil includes at least one turn of the phase line. The turn of any one of the coils including only one turn is turned around a central axis of the coil. The turns of any one of the coils including more than one turn are consecutive sections of the phase line turned around a central axis of the coil. The at least two coils of each phase line are located next to each other so as to form a sequence of coils.

13 Claims, 12 Drawing Sheets

(51) Int. Cl.
*H01F 38/14* (2006.01)
*H02J 5/00* (2016.01)

(56) References Cited

U.S. PATENT DOCUMENTS

| | | | | |
|---|---|---|---|---|
| 2004/0061400 A1* | 4/2004 | Fukushima | ............... | H02K 3/28 310/184 |
| 2005/0103545 A1* | 5/2005 | Green | ..................... | B60L 5/005 180/168 |
| 2008/0129246 A1* | 6/2008 | Morita | ................... | B60L 5/005 320/108 |
| 2009/0067207 A1 | 3/2009 | Nishino | | |
| 2009/0267207 A1* | 10/2009 | Koide | ................... | H01L 21/561 257/686 |
| 2010/0097830 A1* | 4/2010 | Wang | ................ | H02M 3/33576 363/126 |
| 2012/0261482 A1* | 10/2012 | Vollenwyder | ........... | B60L 5/005 238/14.05 |
| 2012/0318625 A1* | 12/2012 | Woronowicz | ........... | B60L 5/005 191/49 |
| 2012/0326498 A1* | 12/2012 | Woronowicz | ........... | B60L 5/005 307/9.1 |
| 2013/0057204 A1* | 3/2013 | Vollenwyder | ........... | B60L 5/005 320/108 |
| 2014/0097675 A1* | 4/2014 | Vollenwyder | ........... | B60L 5/005 307/9.1 |
| 2014/0318912 A1* | 10/2014 | Woronowicz | ........... | B60L 5/005 191/10 |
| 2014/0318913 A1* | 10/2014 | Woronowicz | ........... | B60L 5/005 191/10 |
| 2015/0035355 A1* | 2/2015 | Woronowicz | ........... | B60L 5/005 307/9.1 |
| 2015/0084406 A1* | 3/2015 | Czainski | ............... | B60L 11/182 307/9.1 |
| 2015/0123486 A1* | 5/2015 | Abe | ..................... | B60L 11/182 307/104 |
| 2016/0001668 A1* | 1/2016 | Ichikawa | ................ | H02J 5/005 307/9.1 |

FOREIGN PATENT DOCUMENTS

| | | |
|---|---|---|
| GB | 1418128 A | 12/1975 |
| JP | 54157205 A | 12/1979 |
| JP | 5863001 A | 4/1983 |
| WO | 2010031595 A2 | 3/2010 |
| WO | 2011135424 A2 | 11/2011 |

* cited by examiner

Fig. 8
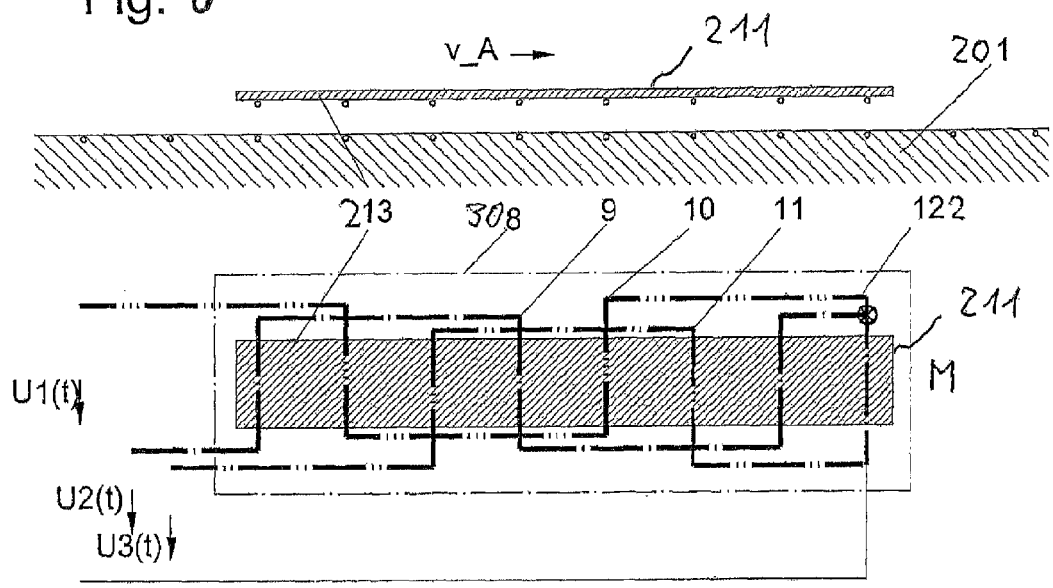
Fig. 9
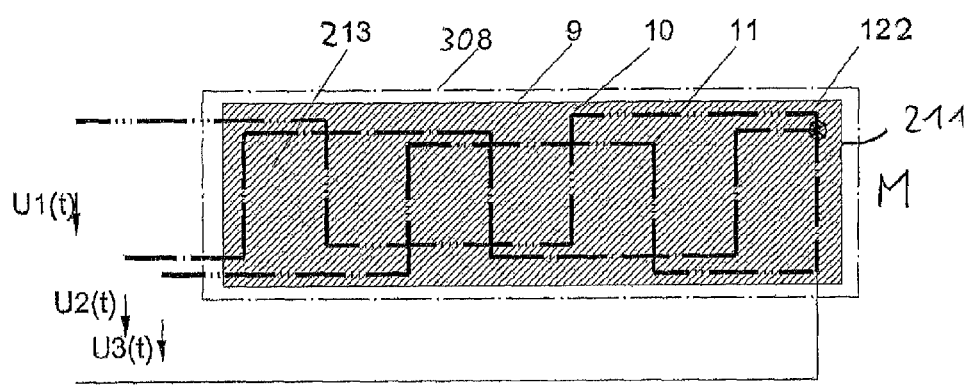
Fig. 10

PROVIDING A VEHICLE WITH ELECTRIC ENERGY USING A RECEIVING DEVICE ADAPTED TO RECEIVE AN ALTERNATING ELECTROMAGNETIC FIELD

CROSS-REFERENCE TO RELATED APPLICATIONS

This application is the United States national phase of International Application No. PCT/EP2012/071770 filed Nov. 2, 2012, and claims priority to Great Britain Patent Application No. 1119152.5 filed Nov. 4, 2011, the disclosures of which are hereby incorporated in their entirety by reference.

BACKGROUND OF THE INVENTION

1. Field of the Invention

The invention relates to an arrangement for providing a vehicle with electric energy, wherein the arrangement comprises a receiving device adapted to receive an alternating electromagnetic field and to produce an alternating electric current by magnetic induction. The receiving device comprises at least one phase line and preferably a plurality of phase lines, wherein each phase line is adapted to carry a different one of a plurality of phase currents of the alternating electric current. In addition, the invention relates to a vehicle comprising the arrangement. Furthermore, the invention relates to a system for transferring energy to a vehicle, wherein the system comprises the arrangement, including the receiving device and a primary side conductor assembly (arrangement) adapted to generate an alternating electromagnetic field to be received by the secondary side receiving device. The invention also relates to a method of manufacturing the arrangement and to a method of operating a vehicle by means of a receiving device which receives an alternating electromagnetic field and produces an alternating electric current by magnetic induction.

2. Description of Related Art

The terms "primary side" and "secondary side" are used corresponding to the terminology which is used for transformers. In fact, the electric parts of a system for transferring electric energy from a vehicle track or from a vehicle stop to the vehicle by induction form a kind of transformer. Therefore, one difference compared to a conventional transformer is the fact that the vehicle, and thus the secondary side, can move.

WO 2010/031595 A2 discloses an arrangement for providing a vehicle, in particular a track bound vehicle, with electric energy, wherein the arrangement comprises a receiving device adapted to receive an alternating electromagnetic field and to produce an alternating electric current by electromagnetic induction. The receiving device comprises a plurality of windings and/or coils of electrically conducting material, wherein each winding or coil is adapted to produce a separate phase of the alternating electric current.

Details of a preferred embodiment of the primary side conductor arrangement are described in WO 2010/031595 A2. For example, the current lines of the primary side conductor arrangement may extend along the track or road in a serpentine manner, i.e. some sections of the lines extend transversely to the travel direction and some sections of the lines extend in the direction of travel, thereby connecting the transversely extending sections. In particular, as illustrated in FIG. 5 and FIG. 12 of WO 2010/031595 A2, the primary side conductor arrangement preferably produces a magnetic wave which propagates in the direction of travel or opposite to the direction of travel. The speed of the wave is determined by the distance of the transversely extending sections and by the frequency of the alternating current which is carried by the different phases of the primary side electric conductor arrangement.

As also described by WO 2010/031595 A2, the receiving device can be located at the underside of a vehicle and may be covered by a ferromagnetic body, such as a body in the shape of a slab or plate. A suitable material is ferrite. The body bundles and redirects the field lines of the magnetic field and therefore reduces the field intensity above the body to nearly zero.

However, such a body of ferromagnetic material or, alternatively, a shield of electrically conducting material, cannot reduce the field intensity of the electromagnetic field to zero at locations sideways of the body or shield. In particular, while persons are entering or leaving the vehicle, they might pass the area sideways of the receiving device. Therefore, corresponding limits of the field intensity apply and must not be exceeded.

SUMMARY OF THE INVENTION

It is an object of the present invention to provide an arrangement for providing a vehicle with electric energy, a vehicle comprising the arrangement, a system comprising the arrangement, a method of manufacturing the arrangement and a method of operating a vehicle by means of a receiving device which reduce the field intensity sideways of the receiving device compared to receiving devices which produce an alternating electric current of the same size.

According to a basic concept of the invention, the receiving device has a "flat" configuration. An example of such a "flat" configuration is described by WO 2010/031595 A2, in particular in connection with FIGS. 13 to 17 of the document. "Flat" in this context means that the phase lines (i.e. the electric lines of the different phases) of the receiving device extend or approximately extend in a horizontal direction, if the primary side conductor arrangement and the track or road of the vehicle also extend in the horizontal direction. However, since such a receiving device typically comprises more than one turn or winding and furthermore comprises more than one phase line, there are crossings of electric lines, if viewed from above. Consequently, despite the flat configuration it is impossible that all sections of the electric lines are located within a flat area having the thickness of a single electric line.

Furthermore, at least one of the phase lines may comprise a coils having more than one turn. A turn is understood to be a section of the phase line which extends around a central axis of the coil. In other words: the section is turning around the central axis. Not in every case all turns perform a complete circulation around the central axis. Rather, in particular the last and first turn of a coil may not perform a complete circulation around the central axis so that electric connections to and from the coil can be made at appropriate locations and in an appropriate manner. On the other hand, if the coil has at least three turns, at least one of the turns is not the first and not the last turn and typically performs a complete circulation around the central axis.

In case of such a coil, the thickness of the coil measured in the direction of the central axis may be equal to the number of turns multiplied by the thickness of the electric line which performs the turns, for example. However, depending on the specific configuration of the coil, the thickness may be, alternatively, greater or smaller than the thickness mentioned before. For example, the consecutive turns may be wound around the central axis of the coil to form a spiral. This reduces the thickness of the coil, but also reduces the effective area of the coil compared to a coil having the same number of turns which all have the size of the outer turn of the spiral. In any case, it is preferred that all coils of the same phase line are formed in the same manner, e.g. all coils are spirals or all coils comprise turns which are stacked upon each other.

A preferred solution of the present invention comprises at least three coils, which are coils of the same phase line. This means that the electric line of at least one of the phase lines forms the at least three coils. A coil is understood to comprise at least one turn and, in case of more than one turn, a plurality of turns is arranged in such a manner, that sections of the different turns extend in parallel to each other, or extend approximately parallel to each other, and, optionally, have the same shape (such as rectangular, circular, etc.). A preferred shape of the turns is rectangular, since a sequence of consecutive coils, each coil having rectangular turns, can be arranged to cover a rectangular effective area, which is the sum of the areas which are covered by the individual coils. The area which is "covered" by an individual coil is the area across which magnetic flux lines of a magnetic field may extend, wherein the magnetic flux which corresponds to these flux lines causes magnetic induction by inducing a corresponding electric voltage in the coil.

The coils of at least one of the phase lines (and preferably of all phase lines) are located next to each other so as to perform a sequence of coils which covers an effective area in a plane that extends perpendicularly to the central axes of the coils. Preferably, there are at least three coils (e.g. five coils) and the sequence of coils comprises in this case a first end coil and a second end coil at the opposite ends of the sequence and there is at least one middle coil (e.g. three middle coils) in between the end coils of the sequence. A longitudinal direction of the sequence extends from the first end coil to the second end coil, i.e. from one end to the opposite end. In particular, the middle coil(s) is/are also arranged along the longitudinal direction so that all coils of the sequence are arranged one behind the other (although some overlapping of neighboring coils may occur). In particular, a longitudinal axis extending in the longitudinal direction may form an axis of symmetry so that the sequence region on the right-hand side of the longitudinal axis and the sequence region on the left hand side of the longitudinal axis are symmetric to each other with respect to the axis of symmetry. This symmetry applies to the course of the turns of the coils, but not necessarily to the connections and connecting lines which connect the coils to each other and to external devices.

Preferably, the effective area is the sum of the areas which are covered by the individual coils of the sequence, i.e. the coils do not overlap. However, a small overlapping area does not significantly reduce the effective area. Furthermore, there may be a small distance between the areas of neighboring coils in the sequence of coils, so that the effective area is not a continuous area. However, it is preferred that the distance is small (e.g. smaller than 2% of the longitudinal direction of the sequence of coils, which is the direction extending from the first end coil to the second end coil).

As will be described in more detail later, the different effective areas which are covered by the sequences of coils of the different phase lines, overlap each other, but are not identical, since the different phase lines are designed to produce the different phases of the alternating electric current. Typically, the alternating electric current is a three-phase sinusoidal current.

The invention is based on the following findings: The electric currents, which flow through the phase lines while the receiving device delivers electric power to any load in the vehicle, produce an electromagnetic field. The electromagnetic fields which are produced by some of the different sections of the phase lines compensate each other by interference. This means that there are regions sideways of the sequence of coils, in particular sideways of the middle section of the sequences of coils, in which the field intensity is small or even close to zero. "Field intensity" in this context means the amplitude of the fluctuating electromagnetic field or the effective value of the field calculated by the root mean square (RMS) of the components (in the directions of a Cartesian coordinate system) of the amplitude. However, there are also regions sideways of the end regions of the sequences of coils having high field intensities. The reason is that the electromagnetic fields which are produced by sections of the end coils of the different phase lines superpose each other, so that increased field amplitudes result compared to the electromagnetic fields which are produced by the individual phase lines. Of course, the phase shift between the phase currents is to be taken into account when the total field is calculated. However, depending on the specific configuration of the receiving device, there are embodiments wherein the field amplitude sideways of the end region of the sequences of coils is more than twice as large as the field amplitudes produced by the individual phase lines.

In existing solutions according to the prior art, all coils of the receiving device typically have the same number of turns. The field intensity which is produced by an electric current of given size is equal to the field intensity which would be produced by coils having a single turn multiplied by the number of turns. Therefore, it would be possible to reduce the field intensity by reducing the number of turns, but this would also reduce the power which can be delivered by the receiving device to the respective load.

It is a basic idea of the present invention to provide/use a sequence of coils having at least two coils for at least one phase line, wherein the number of turns of the coils of the sequence differs. In particular, each phase line of the receiving device has a sequence having at least two coils. Preferably, each phase line of the receiving device has the same number of coils. With respect to the method of manufacturing the arrangement, it is proposed to choose the number of turns in such a manner that, during operation, the field intensity of the electromagnetic field sideways of the arrangement has a smaller maximum value compared to the case that the number of turns of all coils of the sequence is equal, but the total number of turns is the same. In particular, the field intensity is the field intensity of the electromagnetic field produced by the electric currents through the electric lines of the receiving device and, optionally, through any further electric line connected to the electric lines of the receiving device. Alternatively, and this is the preferred case, the field intensity is the intensity of the electromagnetic field, which is the field resulting from the field produced by the electric lines of the receiving device (and optionally by any electric line connected to these electric lines) and resulting from the operation of a primary side conductor arrangement which produces the electromagnetic field which induces the electromagnetic voltage in the receiving device by magnetic induction. In this case, the intensity is the intensity of the total field produced during operation of the system for inductively transferring energy from the primary side to the secondary side receiving device.

In particular, the intensity as a function of the location, in particular the location along a straight line sideways of and in parallel to the central axis of the coil arrangement, can be simulated and/or measured for a given distribution of turns. In addition, the distribution of turns can be varied and, in this manner, the distribution of turns can be identified which produces the smallest maximum value of the field among all of the distribution of turns having the same total number of turns. This procedure can be performed for a single phase of the alternating electric current through the receiving device or, as preferred, can be performed for the arrangement comprising all phase lines. In particular, the distribution of turns can vary with respect to the different phase lines of the receiving device, although the total number of turns per phase may be equal. However, in many cases, the same distribution of turns for each phase line of the arrangement results in a significantly reduced maximum intensity compared to the case in which all coils of the arrangement have the same number of turns.

Since the field intensity sideways of the middle region of the sequences of coils is smaller than the field intensity sideways of the end regions of the sequences of coils, it is preferred to choose a smaller number of turns for the end coils than for the middle coils, in case the sequence having at least three coils. Fortunately, the compensation of the electromagnetic fields sideways of the middle region of the sequences of coils is very effective (i.e. the resulting field amplitude is very small) and, therefore, the number of turns by which the end coils are reduced can be added to the middle coil or middle coils, without increasing the field intensity sideways of the middle region of the sequences of coils above the level of the field intensity sideways of the end regions of the sequences of coils. This is especially valid, if there is more than one middle coil. Therefore, a preferred embodiment of the invention comprises four coils in each sequence of coils, so that there are two middle coils and two end coils in each sequence. In this configuration, the two middle coils and parts of the two end coils produce electromagnetic fields which compensate each other in an efficient manner and only small parts of the different phase lines produce electromagnetic fields which produce an increased field amplitude in regions sideways of the end coils.

However, the present invention also covers cases where only two coils form a sequence of coils of a phase. In particular, if there are two or three phases or even more phases (i.e. the conductor arrangement of the receiving device produces an alternating electric current having two or more phases), the number of turns per coil in the sequence of coils of at least one phase can be selected in such a manner that the resulting field intensity has a smaller maximum value compared to equal numbers of turns and the same total number of turns of the phase line.

According to the basic concept of the invention mentioned above, the number of turns of the coils of the sequence for at least one of the phase lines differs. Preferably it differs by at least one turn.

Therefore, the following is proposed: an arrangement for providing a vehicle with electric energy, wherein the arrangement comprises a receiving device adapted to receive an alternating electromagnetic field and to produce an alternating electric current by magnetic induction, wherein the receiving device comprises a plurality of phase lines, each phase line being adapted to carry a different one of a plurality of phase currents of the alternating electric current, wherein
 each phase line forms at least two coils,
 each coil consists of at least one turn of the phase line,
 if any one of the coils consists of one turn, the turn is turning around a central axis of the coil,
 if any one of the coils consists of more than one turn, the turns are consecutive sections of the phase line turning around a central axis of the coil,
 the at least two coils of each phase line are located next to each other so as to form a sequence of coils which covers an effective area in a plane that extends perpendicularly to the central axes of the coils, so that there are a first and a second end coil at the opposite ends of the sequence and optionally, in the case of three or more coils, at least one middle coil in between the end coils of the sequence, for at least one of the phase lines (and preferably for all phase lines), the number of turns per coil of the sequence of coils differs.

In particular, the at least one of the phase lines may comprise three or more than three coils, so that the sequence of coils comprises at least one middle coil in between the end coils of the sequence, wherein each of the end coils consists of a smaller number of turns than the middle coil or middle coils.

The configuration of the turns of the phase line can be called a "distribution of turns". For example, the total number of coils of a phase line may be fixed and the field intensity as a function of location and/or the maximum of the field intensity may be optimized by distributing the total number over the individual coils, in particular in the best manner possible. Special distribution features will be described in the following. In any case, it is preferred that the distribution of turns in each sequence of coils of a particular receiving device is the same.

The invention also covers a vehicle comprising the arrangement of one of the embodiments described in this description, wherein the arrangement is located at the bottom of the vehicle, so that the central axes of the coils extend in vertical direction, provided that the vehicle travels on a horizontal underground or horizontal track.

Furthermore, the invention covers a system for transferring energy to a vehicle, wherein the system comprises a primary side electric conductor arrangement, which is arranged along a path of travel of the vehicle, wherein the primary side conductor arrangement is adapted to carry an alternating current which generates a respective alternating electromagnetic field and wherein the system comprises the arrangement of one of the embodiments described in this description, as a secondary side arrangement for receiving the alternating electromagnetic field in order to produce an alternating electric current by magnetic induction.

Furthermore, a method is proposed of manufacturing an arrangement for providing a vehicle with electric energy, wherein a receiving device of the arrangement is manufactured which is adapted—during operation—to receive an alternating electromagnetic field and to produce an alternating electric current by magnetic induction, wherein the receiving device is equipped with a plurality of phase lines, each phase line being adapted—during operation—to carry a different one of a plurality of phases of the alternating electric current, wherein
 at least two coils are formed by each phase line,
 each coil is constituted by at least one turn of the phase line,
 if any one of the coils is constituted by one turn, the turn is formed so as to turn around a central axis of the coil,
 if any one of the coils is constituted by more than one turn, the turns are formed as consecutive sections of the phase line so as to turn around a central axis of the coil, the at least two coils of each phase line are located next to each other so as to form a sequence of coils which covers an effective area in a plane that extends perpendicularly to the central axes of the coils, so that there are a first and a second end coil at the opposite ends of the sequence and optionally, in the case of three or more coils, at least one middle coil in between the end coils of the sequence, for at least one of the phase lines, (and preferably for all phase lines) the number of turns per coil of the sequence of coils is chosen so that they differ.

In particular, the at least one of the phase lines may be equipped with three or more than three coils, so that the sequence of coils comprises at least one middle coil, wherein each of the end coils is constituted by a smaller number of turns than the middle coil or middle coils.

In particular, at least one measurement, simulation and/or calculation of a field intensity of an electromagnetic, electric or magnetic field produced by the arrangement and alternatively or in addition produced by a system, which includes the arrangement and further includes a primary side conductor arrangement for generating an electromagnetic field, may be performed and—based on a result of the measurement, simulation and/or calculation—the number of turns of the coils of the at least one of the phase lines may be varied and chosen for the arrangement to be used in practice. Preferably, the measurement, simulation and/or calculation of the field intensity may be performed repeatedly, in particular iteratively, for different distributions of turns having the same total number of turns.

In addition, a method is proposed of operating a vehicle by means of a receiving device which receives an alternating electromagnetic field and produces an alternating electric current by magnetic induction, wherein a plurality of phase lines is used by the receiving device, wherein each phase line carries a different one of a plurality of phases of the alternating electric current, wherein each phase line is operated using at least two coils,
in each coil the alternating electric current is carried by at least one turn of the phase line,
if any one of the coils consists of one turn, the turn is turning around a central axis of the coil,
if any one of the coils consists of more than one turn, the turns are consecutive sections of the phase line turning around a central axis of the coil,
the at least two coils of each phase line are used as a sequence of coils which covers an effective area in a plane that extends perpendicularly to the central axes of the coils, so that there are a first and a second end coil at the opposite ends of the sequence and optionally, in the case of three or more coils, at least one middle coil in between the end coils of the sequence,
in at least one of the phase lines (and preferably in all phase lines), the number of turns per coil of the sequence of coils, through which the phase current of the alternating electric current flows, differs.

In particular, if the sequence of coils comprises three or more than three coils, so that the sequence of coils comprises at least one middle coil, the phase current of the alternating electric current flows preferably through a smaller number of turns in the end coils than in the middle coil or middle coils.

Embodiments of the method of manufacturing the arrangement and of the method of operating a vehicle by means of the receiving device follow from the description of the embodiments of the arrangement.

In particular, it is preferred that the at least one of the phase lines (and preferably each of the phase lines) comprises three or more than three coils, so that the sequence of coils comprises at least one middle coil in between the end coils of the sequence. Each of the end coils consists of a smaller number of turns than the middle coil or middle coils. Preferably, in case of three coils in a sequence, the ratio of the numbers of turns forming the end coils to the number of turns forming the middle coil is in the range of 0.33 to 0.66, preferably in the range of 0.4 to 0.6, in particular 0.5.

In particular, the at least one of the phase lines may comprise at least four coils, so that the sequence of coils comprises at least two middle coils. In addition or alternatively, two of the middle coils, which are neighboring coils in the sequence, may consist of the same number of turns of the phase line. However, there are alternative embodiments having three middle coils or at least three middle coils and the number of turns of a center coil which is located in between two other middle coils differs from the numbers of turns of the other middle coils. In any case, four or more than four coils enable configurations in which the number of turns of the end coils is reduced by a higher amount of turns, since there are more middle coils which may have an increased number of coils.

In a particularly preferred embodiment, the at least one of the phase lines (and preferably each of the phase lines) comprises at least four coils, so that the sequence of coils comprises at least two middle coils, wherein the two end coils optionally consist of the same number of turns of the phase line and wherein the ratio of the number of turns forming each of the end coils to the number of turns forming the middle coils next to (i.e. neighboring) the respective end coil is in the range of 0.33 to 0.66, preferably 0.4 to 0.6, in particular 0.5. Investigations of the inventor have shown that the ideal distribution of turns for a sequence of four coils is characterized by a ratio close to 0.5. However, not all total numbers of turns in a sequence allow for the ratio being exactly 0.5 or nearly exactly 0.5. For example, a total number of twenty turns follows in a preferred distribution of turns of 3-7-7-3, i.e. the end coils have three turns and the middle coils have seven turns. For five coils, the distribution may be 2-4-3-4-2 or 4-9-6-7-4, for example. Preferably, in case of five coils, the center coil has the number of turns which is the average number per coil.

An optimization of the distribution of turns which reduces the maximum value of the field intensity in a predetermined range of locations by distributing the total number of turns of a sequence of coils over the individual coils of the sequence in an optimized manner may start with a distribution, wherein the only middle coil or the middle coils next to the end coils have a larger number of turns than the neighboring end coil, according to the condition described in the preceding paragraph. Then, the distribution of turns may be amended and it may be determined if the amendment has resulted in an improved (reduced) field maximum value in the predetermined range of locations. In particular, the total field caused by the primary side conductor arrangement and the secondary side receiving device can be taken into account for the optimization.

However, in particular if the total field of a system for transferring energy from a primary side conductor arrangement to the secondary side receiving device is taken into account, and if the sequence of coils comprises five coils, the number of turns per coil in the three middle coils may differ. For example, the total number of turns of the five coils may be 15. In this case, the distribution of turns may be 2-4-3-4-2, i.e. the center coil has only three turns, while the two other middle coils have four turns. In case of a total number of 35 turns, the distribution may be 5-9-7-9-5 or, alternatively, 4-10-7-10-4. Therefore, the rule mentioned above for four coils in a sequence of coils may be adapted to five or more than five coils in the following manner: The ratio of the number of turns forming each of the end coils to the number of turns forming the middle coils immediately neighboring the end coils is in the range of 0.33 to 0.66, preferably in the range of 0.4 to 0.6, in particular 0.5. However, it is not necessary that the two middle coils which immediately neighbor the end coils have the same number of turns. In particular, their number of turns may differ by one or two. In addition or alternatively, the number of turns of the two end coils may differ by one or two or by another number.

Optimizing the distribution of turns, in particular by reducing the number of turns of the end coils and increasing the number of middle coils, has the advantage that maximum limits of the field intensity can be observed without using additional material for shielding the environment from the electromagnetic field or magnetic field. In addition, it is not required to reduce the total number of turns and/or to reduce the field intensity of the electromagnetic field produced by the primary side conductor arrangement. The invention is particularly useful for inductive power transfer systems having comparatively large distances between the primary side conductor arrangement and the secondary side receiving device, which occur in particular while a vehicle comprising the secondary side receiving device moves relatively to the primary side conductor arrangement.

Generally, the criterion for the optimization of the distribution of turns is preferably the maximum value of the field intensity (in particular the RMS of the magnetic field amplitude) in a predetermined range of locations, such as along a straight line in parallel to the center line of the coil arrangement.

As mentioned above, the lengths of sections of an electric line which form a complete turns may vary for different turns of the same coil and may as well vary for different coils. However, it is preferred that all coils of the same sequence of coils and, preferably, all coils of the whole coil arrangement have the same shape and cover the same area. In particular, the sections of an electric line which form a complete turn may have different lengths if a coil is formed by a spiral. However, as will be described with reference to the attached figures, even in this case the difference of the lengths of the turns is comparatively small (e.g. differs by maximal 10%). However, generally speaking, a different number of turns is equivalent to a different total length of the electric line which forms a coil having a plurality of turns.

A further embodiment is based on the following findings: The field intensity of the electromagnetic field, which is produced by the electric currents through the phase line(s) of the receiving device during operation, can be reduced solely by using a sequence having five coils (at least for one phase line and preferably for all phase lines of the receiving device). In case of five coils, there are pairs of phase line sections, which extend transversely to the longitudinal direction of the sequence of coils. The electric current which flows through these transversely extending phase line sections produce electromagnetic fields which compensate each other partially, if each pair of transversely extending sections is considered. Due to the odd number of coils, the transversely extending sections of the phase line can be grouped completely in pairs of this kind. In contrast, transversely extending sections of a phase line of a sequence of coils having an even number of coils cannot be grouped completely in pairs of this kind. Rather, there will be a remaining transversely extending section (or in case of coils having more than one turn, a corresponding number of remaining transversely extending sections) having no compensating partner section. In addition, in case that all coils of the sequence have the same shape and cover an area of the same size, all electric currents flowing through the coils are symmetric with respect to a point on the central axis of the center coil.

Furthermore, compared to a sequence having three coils only, a sequence having five coils has the advantage that there is a significantly larger middle section constituted by the three middle coils. The field intensity sideways of the middle section is small compared to the field intensity sideways of the end sections, as described above. Compared to a sequence having seven or more than seven coils, a sequence having five coils has the advantage that the number of coils is smaller and, therefore, weight and energy losses during operation are reduced. In particular, energy losses are caused by the resistance of the phase line and electric currents which are induced in any ferromagnetic material which is combined part of the receiving device. In addition, the pole pitch, i.e. the distance of the poles of the magnetic field produced by the sequence of coils due to induction, is larger for four coils compared to seven or more coils.

The advantages of a sequence formed by five coils also apply if the coils of the sequence have the same number of turns (i.e. the lengths of the sections of the phase line, which sections form in each case one coil, are equal). Therefore, although not preferred, this embodiment also comprises the case that all five coils of the sequence have the same number of turns. However, as preferred, the number of turns of the coils of the sequence(s) differs as described elsewhere in this specification. In this case, the advantage of five coils adds to the advantage of an optimized distribution of turns.

Therefore, generally speaking, the embodiment comprising a sequence having five coils can be defined as follows: an arrangement for providing a vehicle with electric energy, wherein the arrangement comprises a receiving device adapted to receive an alternating electromagnetic field and to produce an alternating electric current by magnetic induction, wherein the receiving device comprises at least one and preferably a plurality of phase lines, each phase line being adapted to carry a different one of a plurality of phase currents of the alternating electric current, wherein each phase line forms five coils,
    each coil consists of at least one turn of the phase line,
    if any one of the coils consists of one turn, the turn is turning around a central axis of the coil,
    if any one of the coils consists of more than one turn, the turns are consecutive sections of the phase line turning around a central axis of the coil,
    the five coils of each phase line are located next to each other so as to form a sequence of coils which covers an effective area in a plane that extends perpendicularly to the central axes of the coils, so that there are a first and a second end coil at the opposite ends of the sequence and three middle coil in between the end coils of the sequence, for the single phase line or for at least one of the phase lines (and preferably for all phase lines).

Corresponding embodiments with respect to five coils per sequence follow from the definitions of the vehicle comprising the arrangement, the system for transferring energy to a vehicle, the method of manufacturing the arrangement and the method of operating a vehicle by means of a receiving device.

In an embodiment, each of the coils of the at least one phase line covers an area of the same size as the other coils of the same sequence of coils within the plane that extends perpendicularly to the central axes of the coils. Especially the widths of the coils may be same. The width is measured in the direction which is perpendicular to the central axes of the coils and which is perpendicular to the longitudinal direction which extends from the first end coil to the second end coil. Especially in the case of the coils having the same widths, decreasing the lengths of the end coils with respect to the longitudinal direction does not reduce the field intensity sideways of the end coils.

The coils of the at least one phase line which are parts of the same sequence of coils may be positioned in a shifted manner relative to each other—with respect to a longitudinal direction extending from the first end coil to the second end coil—by a constant first shift length. "Shifted" means that the coils are not stacked, but distributed in the longitudinal direction. Therefore, the first shift length is not the distance between two neighboring coils (since there might not be a distance at all if the coils overlap or are placed next to each other without a distance), but is the length by which two neighboring coils are shifted starting from the hypothetical initial state of staked coils. In case of coils having the same form (e.g. rectangular or circular, etc.), the first shift length is the length by which one of the two neighboring coils is to be moved so that the two neighboring coils exactly cover the same area. It is preferred that the first shift length is equal to one half of a wave length of a pre-defined electromagnetic wave which is produced by the alternating electromagnetic field while propagating in the longitudinal direction during operation of the arrangement.

The primary side electric conductor arrangement may be adapted to produce the pre-defined electromagnetic wave. Producing such a moving or propagating electromagnetic wave using a primary side conductor arrangement which is fixed relative to the track or road of the vehicle, is known from WO 2010/031595 A2. For example, FIG. 12 and the corresponding description in the document describe such a moving wave. If the first shift length is equal to one half of the wave length, the coils of the same sequence of coils carry the maximum possible phase current, while the phase current flows in opposite directions through each pair of neighboring coils, if viewed in the direction of the central axes (e.g. if viewed from above). Of course, the phase current flows in the same direction through the whole phase line, according to the basic principles of electricity. In other words, two neighboring coils are wound in opposite direction if the extension of the phase line is followed and if viewed in the direction of the central axes.

In particular, the different sequences of coils of the phase lines are positioned shifted relative to each other—with respect to the longitudinal direction extending from the first end coil to the second end coil of any of the sequences of coils—by a second shift length, wherein the second shift length is equal to an integer multiple of the first shift length divided by the number of phase lines. For example, in the case of three phase lines, the sequences may be shifted by ⅓ (which is preferred, since the total length of the arrangement of sequences is smaller) or by ⅔ of the first shift length. Consequently, the integer would be 1 or 2 in these examples.

BRIEF DESCRIPTION OF THE DRAWINGS

Examples of the invention will be described in the following with reference to the attached figures.

FIG. 8 shows a schematic side view of the receiving device of a vehicle, wherein the receiving device comprises a layer having the coils and further comprises a ferromagnetic body on top of the layer, FIG. 9 shows a top schematic top view of the coils of FIG. 1 and FIG. 8, including the position of the ferromagnetic body on top of the phase line layer, FIG. 10 shows an alternative embodiment of the arrangement shown in FIG. 9, wherein the ferromagnetic body fully covers the effective area which is covered by the coils, FIG. 11 schematically shows a top view of a sequence of coils, wherein the coils are formed by turns which are wound in spirals, FIG. 12 measurement values of the field intensity (here: RMS) along a straight line extending in parallel to the center line of the coil arrangement of a receiving device, wherein the straight line extends at a distance of 140 cm to the center line and wherein the values of the field intensity have been measured for a distribution of turns of a three-phase coil arrangement having equal numbers of turns in each coil, wherein the field intensity refers to the total field produced by the electric conductors of the coil arrangement and by a primary side conductor arrangement, FIG. 13 the simulated total field intensity along the straight line as described with respect to FIG. 12 for a similar primary side conductor arrangement, FIG. 14 the simulated total field intensity in the same situation as shown in FIG. 13, but for an optimized distribution of turns, according to the present invention, and FIG. 15 an arrangement similar to the arrangement shown in FIG. 1, but with five coils per sequence.

FIG. 1 shows four sequences of coils, wherein each sequence is formed by a different phase line of a conductor arrangement for producing a three-phase alternating current by magnetic induction. The arrangement is part of a receiving device mounted to a vehicle.

DESCRIPTION OF THE INVENTION

The present invention can be applied to any land vehicle, in particular track bound vehicles, such as rail vehicles (e.g. trams), but also to road automobiles, such as individual (private) passenger cars or public transport vehicles (e.g. busses). Preferably, the primary side conductor arrangement which produces the alternating electromagnetic filed is integrated in the track or road of the vehicle so that the electric lines of the primary side conductor arrangement extend in a plane which is nearly parallel to the surface of the road or track on which the vehicle may travel. The alternating electromagnetic field can be received by the receiving device during travel or while the vehicle stops or is parked.

Figure 1:
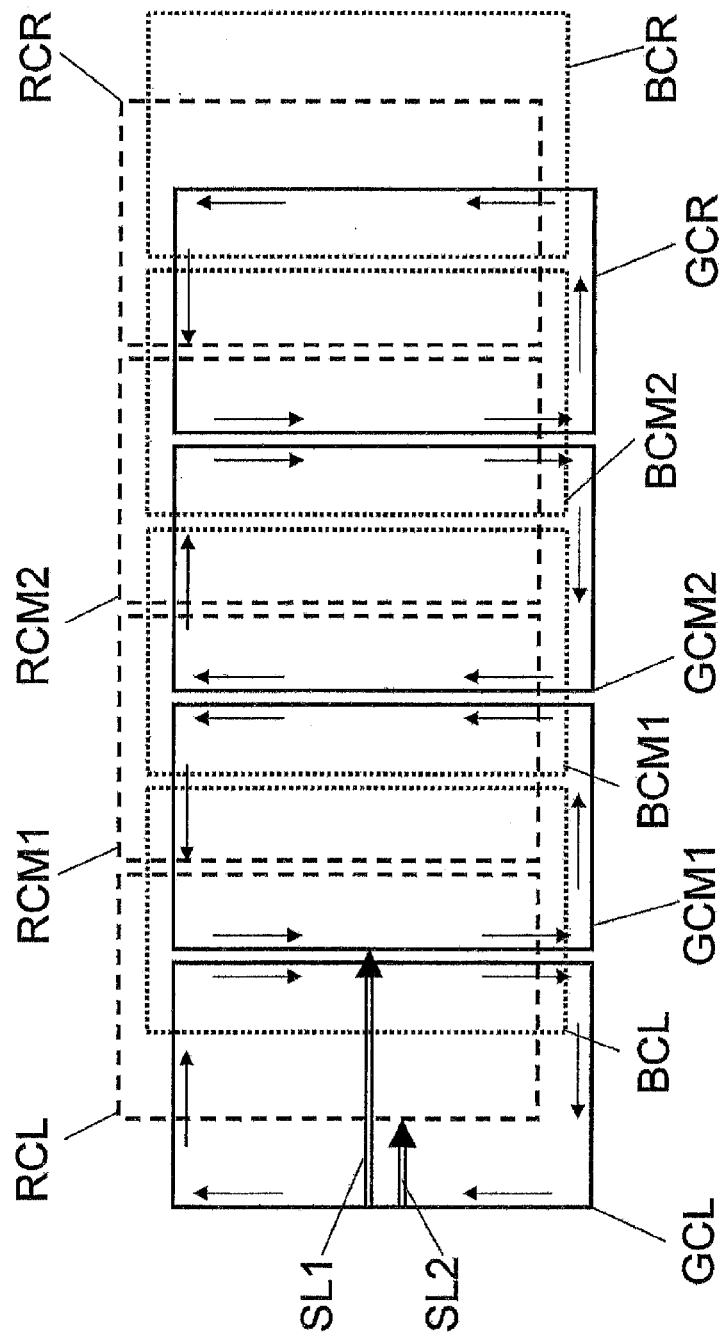
FIG. 1 schematically shows a top view of an arrangement for providing a vehicle with electric energy, wherein the arrangement comprises three phase lines, wherein each phase line forms a sequence of four coils which are placed next to each other, FIG. 2 schematically shows two coils of each of the phase lines of FIG. 1, wherein an electromagnetic wave is also shown in order to illustrate the field intensity of an alternating magnetic field at a first point in time, FIG. 3 schematically shows an illustration similar to the illustration shown in FIG. 2, but at a later point in time.

Each of the sequences G, R, B comprises four coils C. The individual coils are denoted by GCL, GCM1, GCM2, GCR for sequence G, by RCL, RCM1, RCM2, RCR for sequence R and by BCL, BCM1, BCM2, BCR for sequence B. In the example, the coils C have a rectangular shape, i.e. the area which is covered by the respective shape is rectangular. Any other shape would be possible alternatively. However it is preferred that the shapes of all coils are the same and that all sequences of the conductor arrangement of the receiving device have the same number of coils. Since each sequence G, R, B of coils C is formed by placing the individual coils C next to each other, the effective area of each sequence G, R, B is also rectangular, in the example. Furthermore, the coils C of the same phase line do not overlap, so that the effective area of the sequence is equal to the sum of the areas which are covered by the coils C of the sequence G, R, B. In order to illustrate the notation more clearly, for example the notation of the coil "GCL" means that the coil is part of the sequence G and that the coil is the left L coil (i.e. the first end coil) in the sequence G. The notation "GCM1" means that the coil C is part of the sequence G and is the first middle M1 coil C. The notation "R" as the third letter in the notation of a coil (e.g. GCR) means that the coil is the right R coil (i.e. the second end coil) in the respective sequence. The three sequences G, R, B shown in FIG. 1 are spread in the vertical direction of the figure, but this is done only for the purpose of illustration. In practice, it is preferred that there is no spread in the direction perpendicular to the longitudinal direction which extends from the left coil to the right coil in each sequence and which is the horizontal direction in FIG. 1.

Figure 2:
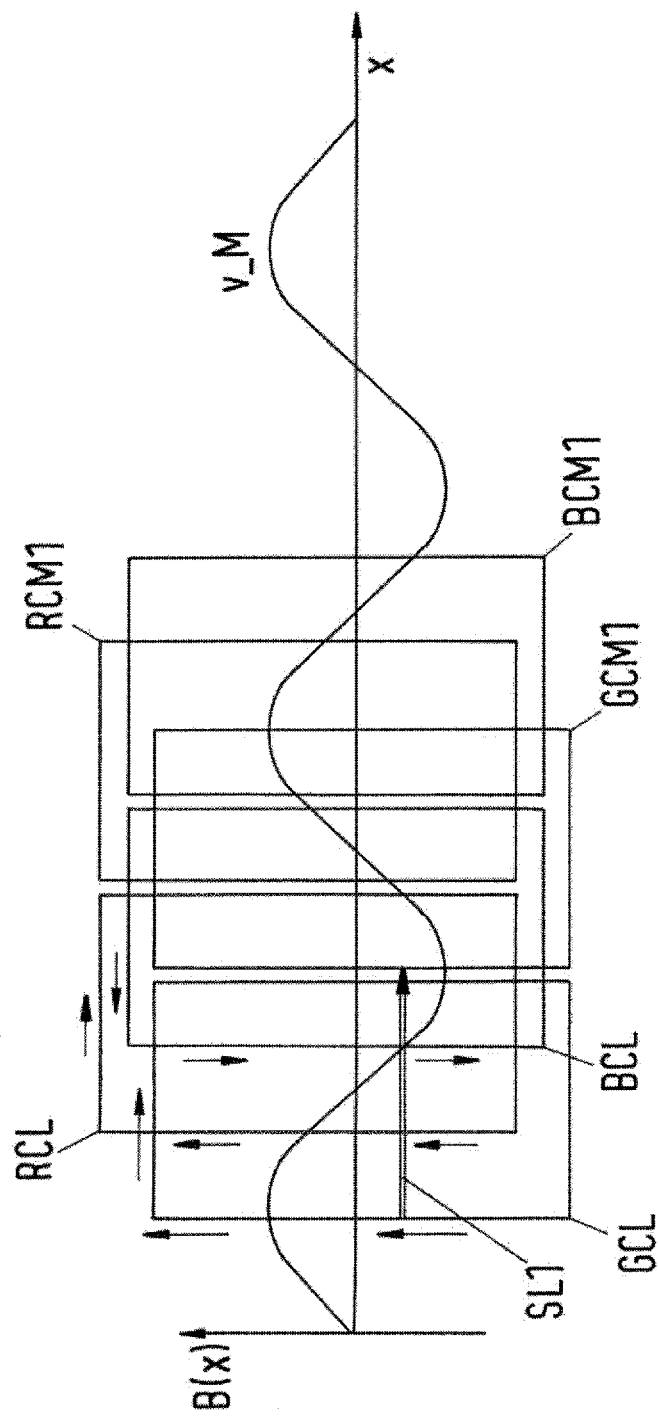
Figure 3:
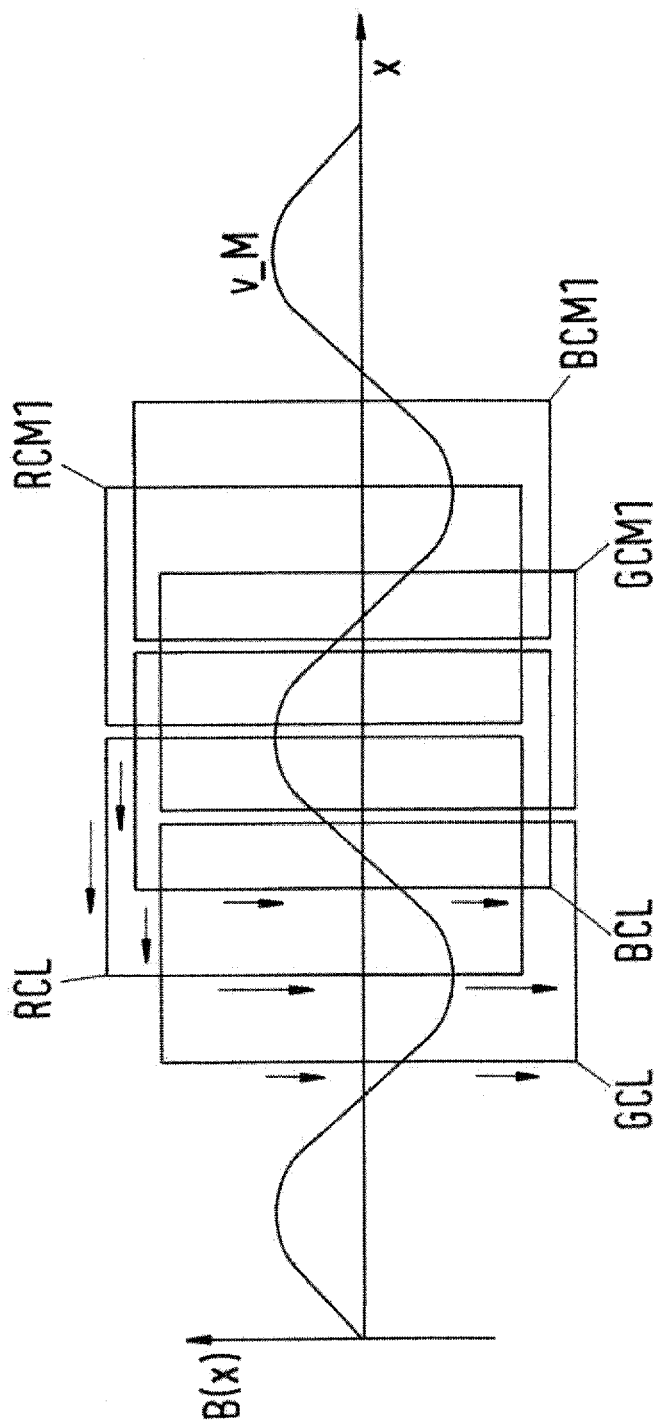
Figure 4:
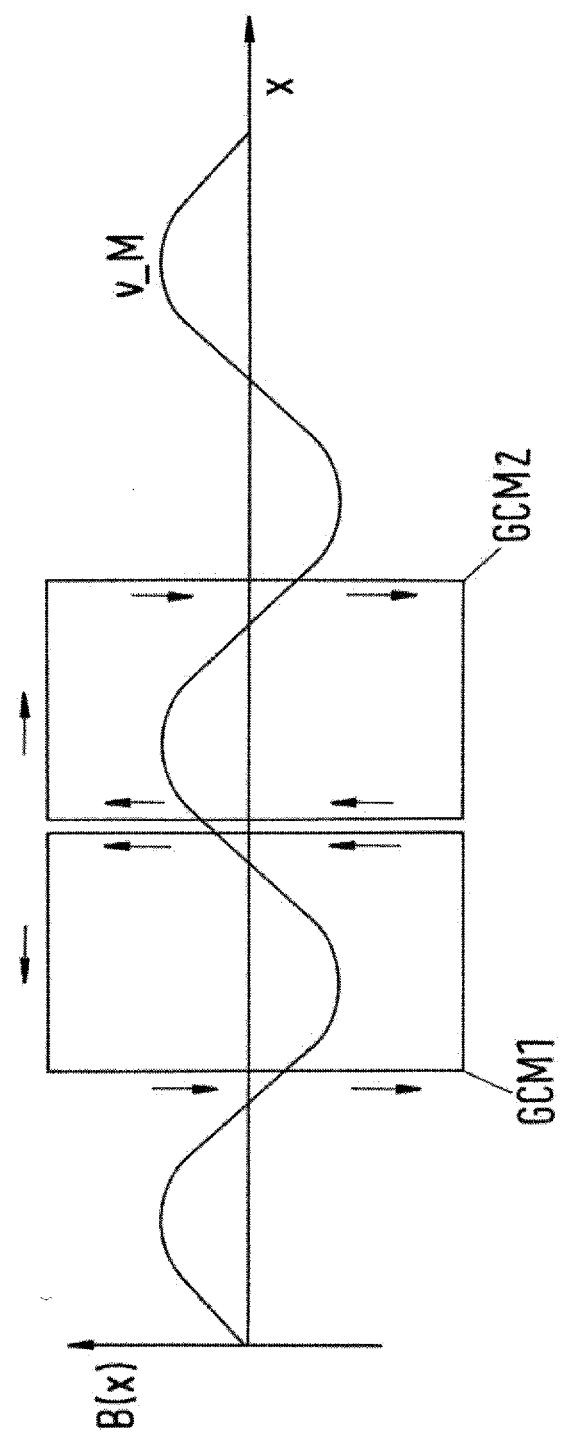
FIG. 4 shows an illustration similar to the illustrations of FIG. 2 and FIG. 3, but for two middle coils of one sequence of coils, FIG. 5 schematically shows the distribution of turns of one sequence of coils, for example of one of the sequences shown in FIG. 1.

The coils of the sequence G are shifted relative to each other by a first shift length SL1 and this first shift length SL1 is constant for all pairs of the coils of sequence G and the same applies to the other sequences R and B. The same may also apply to other arrangements which may comprise a different number of coils per sequence. The first shift length SL1 is illustrated by a double line arrow. There are also single line arrows extending next to the coils C of the sequence G. These single line arrows illustrate the direction of winding the phase line in order to produce the turns which constitute the coils C. The other sequences R, B are formed in the same manner as the sequence G. However, the different sequences G, R, B are shifted relative to each other by a second shift length SL2, which is also illustrated by a double line arrow for the sequences G, R. The third sequence B is also shifted by the same second shift length SL2 relative to the second sequence R. This second shift length SL2 is ⅓ of the first shift length SL1. In case of an electromagnetic field, which has varying periodic field intensity with respect to the longitudinal direction (such varying magnetic fields are shown in FIG. 2-FIG. 4), wherein the period length is equal to the first shift length SL1 multiplied by two, electric currents of the same sizes are induced in each line section which extends transversely to the longitudinal direction, provided that these line sections are placed at the same position in the longitudinal direction or at the same position plus or minus two times the first shift length SL1. In the following figures FIG. 2-FIG. 4, some situations concerning the induction of electric voltages and resulting electric currents are discussed, including the effects on the field amplitude of the field sideways of the arrangement. "Sideways" means not above and not below of the sequences, but in the horizontal or vertical direction of FIG. 1 sideways of the sequences G, R, B.

Figure 15:
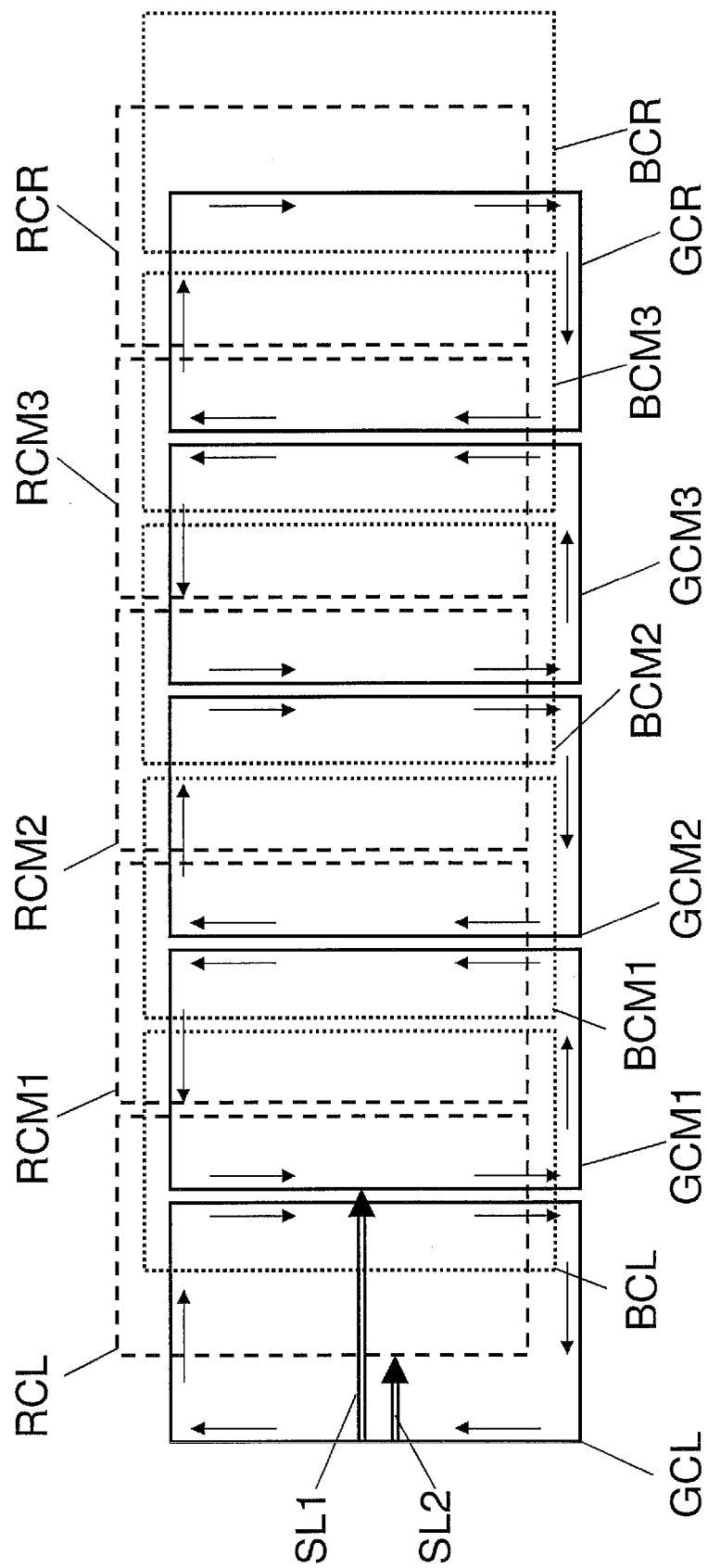

FIG. 15 shows a variant of FIG. 1 for an arrangement having five coils per sequence. Therefore, the individual coils are denoted by GCL, GCM1, GCM2, GCM3, GCR for sequence G, by RCL, RCM1, RCM2, RCM3, RCR for sequence R and by BCL, BCM1, BCM2, BCM3, BCR for sequence B. Otherwise, the description of FIG. 1 and of other variants and/or features of the arrangement schematically shown in FIG. 1 also applies to the arrangement schematically shown in FIG. 15.

FIG. 2 to FIG. 4 also show top views on coils of the arrangement shown in FIG. 1 or FIG. 15, but not all coils are shown and the figures also show a magnetic wave. The magnetic wave moves at speed v_M in the longitudinal direction of the sequences of coils, which is denoted by the "x-direction". Only for illustration purposes, the direction perpendicular to the longitudinal direction is used to illustrate the varying magnetic flux B. In practice, the magnetic flux B actually varies in the longitudinal direction, but does not vary significantly in the direction perpendicular to the longitudinal direction which is also perpendicular to the central axes of the coils (these axes therefore extend perpendicular to the image plane of FIG. 1 to FIG. 4 and FIG. 15). The corresponding flux lines of the magnetic field extend approximately parallel to each other and also parallel to the central axes of the coils.

The magnetic flux B(x) is a sine-function of the location x. The wave length is equal to the first shift length SL1 multiplied by two. At the point in time which is illustrated in FIG. 2, the magnetic flux B is maximal at the left end of coil GCL, which is also the left end of the sequence of G of coils. Since the different sequences G, R, B are shifted relative to each other by the second shift length SL2, the magnetic flux at the left end of sequence R (i.e. the left end of coil RCL) is still positive. Therefore, the electric current which flows through the electric line at the end of coil RCL flows in the same direction as the electric current through the electric line at the left end of coil GCL, but is smaller. However, the electric current which flows through the electric line at the left end of coil BCL flows in the opposite direction. Consequently, the magnetic fields which are caused by the electric currents through the coils in the region of the left ends compensate each other partially.

In contrast, FIG. 3 shows another point in time where the electric currents through the electric lines at the ends of coils GCL, RCL, BCL flow in the same direction. Consequently, the magnetic fields which are produced by these currents do not compensate each other, but produce an aggravated magnetic field. The same applies to the currents in the other parts of the coils GCL, RCL, BCL at the left ends of the sequences G, R, B. Of course, the same also applies to the coils GCR, RCR, BCR at the opposite ends of the sequences G, R, B. The aggravated resulting field can be observed sideways of the end coils.

The situation sideways of the middle coils of the sequences is different, as shown in FIG. 4. As an example, the middle coils GCM1, GCM2 of sequence G are depicted. The electric currents which are caused by the magnetic wave circulate in opposite directions through these two neighboring middle coils. Therefore, for example sideways of the middle coils at the top of FIG. 4, the magnetic fields which are caused by the current through the middle coils GCM1, GCM2 compensate each other partially.

Figure 5:
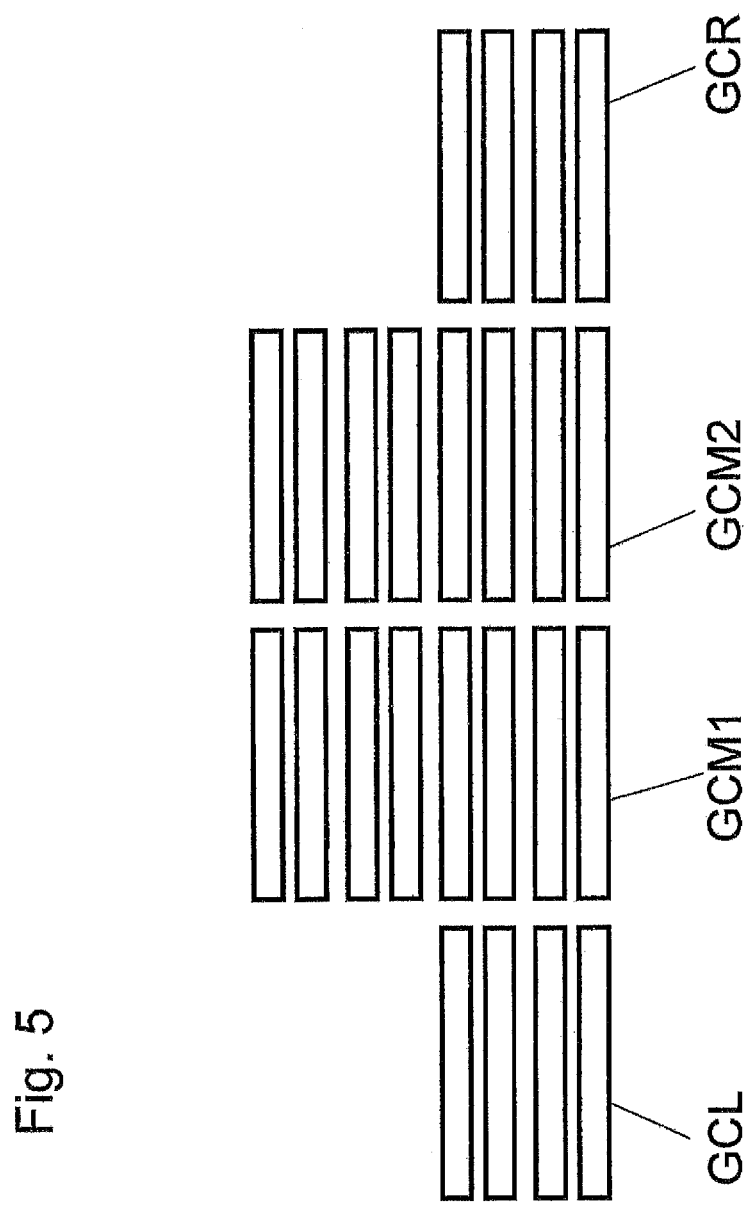

Therefore, in view of the observations which were illustrated with reference to FIG. 2, FIG. 3, FIG. 4, the number of turns in the end coils can be chosen smaller than the number of turns in the middle coils. FIG. 5 illustrates schematically a specific example, wherein the total number of turns in all coils of sequence G is twenty-four. Each turn is represented by a rectangle. For example, the left coil GCL and the right coil GCR have in each case four turns and the middle coils GCM1, GCM2 have in each case eight turns, as illustrated in FIG. 5. In case of five coils per sequence, the third middle coil GCM3 may have the number of turns of the second middle coil GCM2 which is shown in FIG. 5 and the second middle coil GCM2 (which is the center coil with respect to the longitudinal direction of the sequence) may have the same or a different number of turns. Preferably, the distribution of turns in case of five coils per sequence is the result of an optimization with respect to the maximum field intensity, as described above and below.

Figure 6:
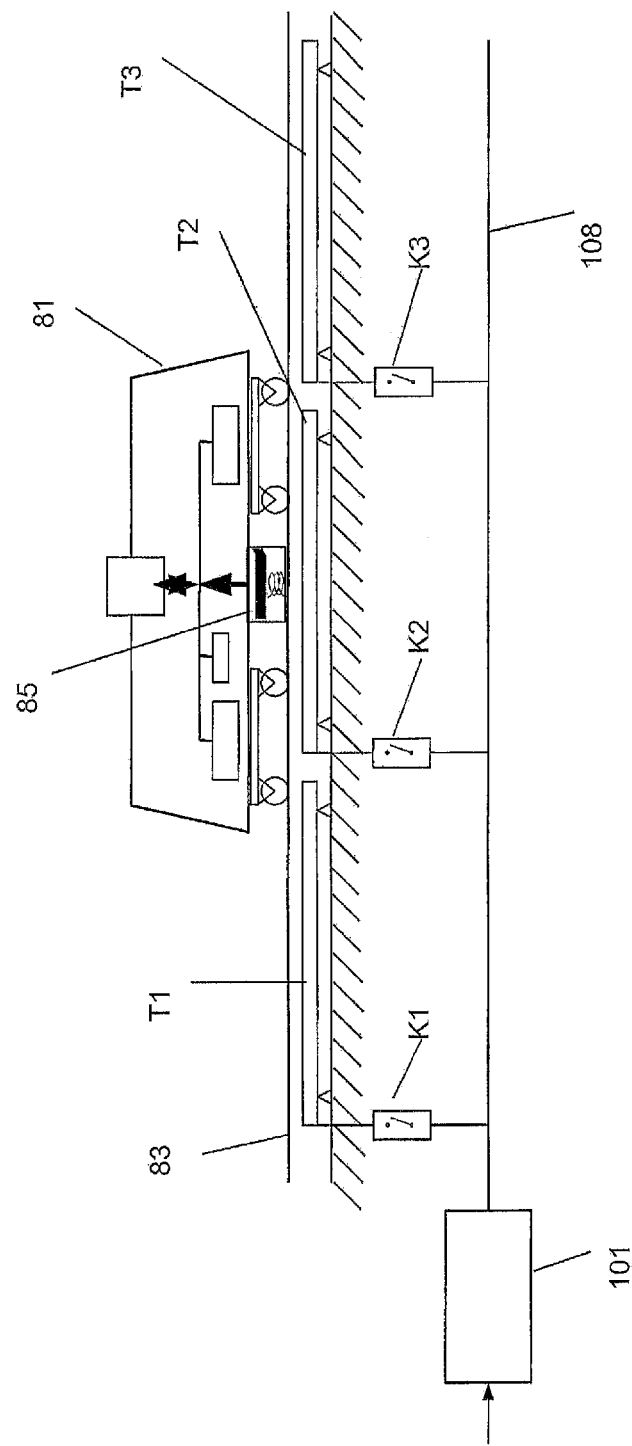
FIG. 6 shows schematically a primary side conductor arrangement for producing an electromagnetic field, in particular for producing a magnetic wave which propagates in the direction of travel of a vehicle, wherein the vehicle is also schematically shown in the figure, FIG. 7 schematically shows the vehicle of FIG. 6, including some devices within the vehicle.

FIG. 6 shows a track 83 (here: a railway track having two rails) which is occupied by a track bound vehicle 81, such as a regional public transport train or a tram. A primary side electric conductor arrangement is mounted to the track for producing an electromagnetic field. It comprises segments T1, T2, T3 which can be operated independently of each other. In the situation shown in FIG. 6, the middle segment T2 is operated only, since a the receiving device 85 of the vehicle 81 is located above the segment T2. For example, the primary side conductor arrangement may be designed as described in WO 2010/031595 A2 in connection with FIG. 1 in the document. As shown in the attached FIG. 6, each of the successive segments T1, T2, T3 may be connected via a separate switch K1, K2, K3 for switching on and off the segment T1, T2, T3 to a main line 108. In the case of a three-phase alternating current system, the mainline 108 may comprise wires or cables for each phase. The far end of the mainline 108 (at the right hand side of FIG. 6, but not shown) may comprise a common star point of all three-phases. Alternatively, the main line 108 may be a DC (direct current) line and the switches K1, K2, K3 may comprise inverters for producing the alternating current through the segments T1, T2, T3. The opposite site of the main line 108 is connected to an energy source 101.

The primary side conductor arrangement may be located underground or above ground. In particular in the case of railways having two rails on which wheels of rail vehicles may roll, the conductor arrangement may be located above ground between the rails on the level of a railway sleeper, or partly above ground, but under the railway sleepers. If the railway sleepers are made of concrete for example, the sleepers or the other construction for holding the rails may comprise holes and/or cavities, through which the line or lines of the conductor arrangement extends. Thereby, the railway construction may be used to hold the line(s) in the desired serpentine shape. In case of a road, the primary side conductor arrangement may also be located underground (i.e. integrated in the material of the road) and/or above ground The track bound vehicle 81 comprises at its underside the receiving device 85 for receiving the electromagnetic field which is produced by the primary side conductor arrangement. The receiving device 85 is electrically connected to an on-board electric network 86 (see FIG. 7) so that the electric energy, which is induced in the receiving device 85 may be distributed within the vehicle 81. For example, auxiliary devices 90 and propulsion units 80, 84 for driving propulsion motors (not shown) in bogies 87a, 87b having wheels 88a, 88b, 88c, 88d may be connected to the distribution network 86. Furthermore, an energy storage 82, such as an electrochemical energy storage and/or an arrangement of capacitors, such as super caps, may also be connected to the distribution network. Therefore, the energy storage 82 may be charged by the energy received by the receiving device 85, in particular during stops of the vehicle 81 on the track. When the vehicle 81 is moving on the track, a part of the propulsion energy which is needed to move the vehicle 81 may be withdrawn from the energy storage 82 and at the same time the energy, which is received by the receiving device may contribute to the propulsion, i.e. may be part of the propulsion energy.

Figure 7:
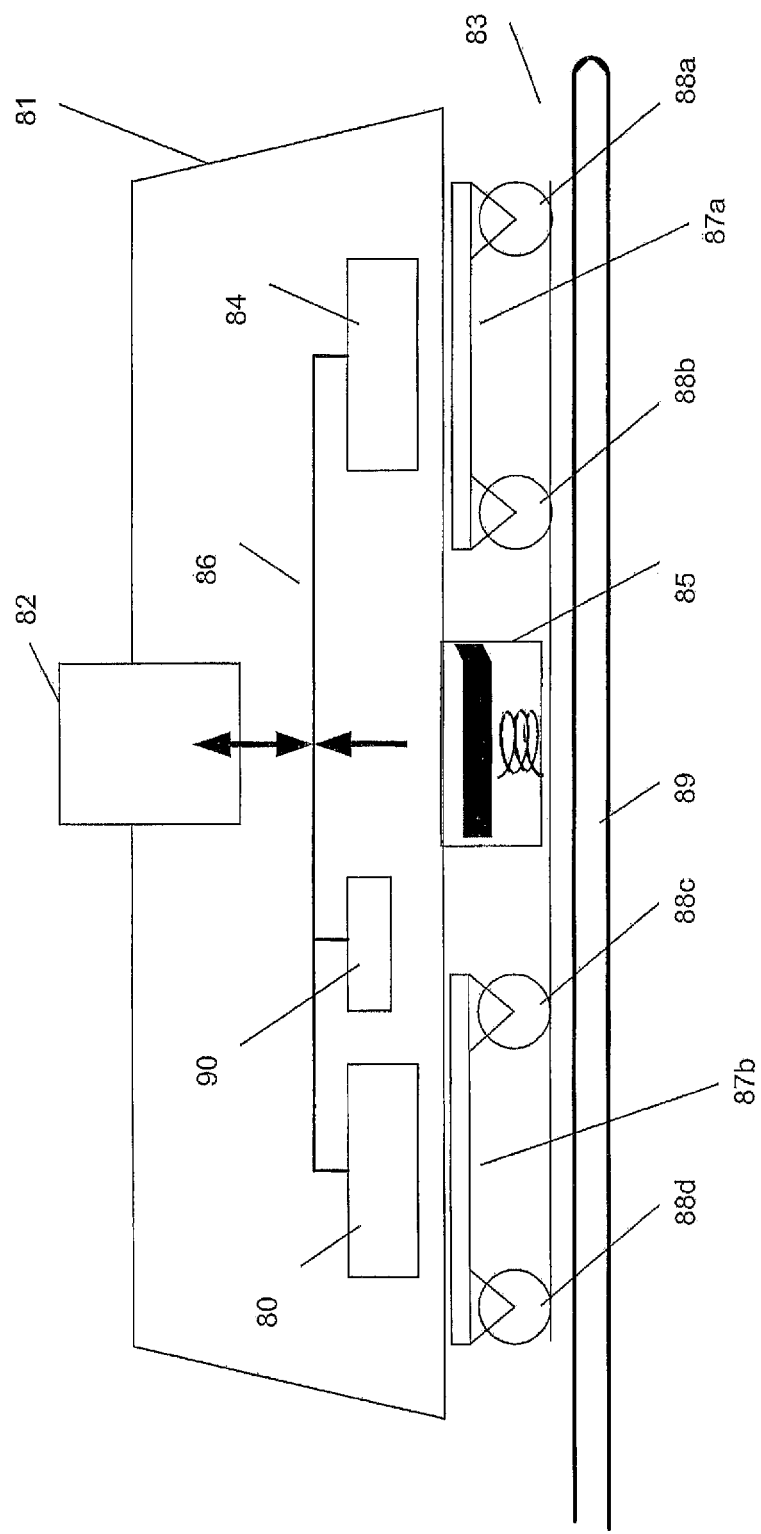

The sectional view of FIG. 8 schematically shows a track 201 and a receiving device 213 of a vehicle above the track 201 (e.g. the track and vehicle of FIG. 6 and FIG. 7). The track 201 and the receiving device 213 comprise electric lines (illustrated as small circles in FIG. 8) which extend transversely to the direction of travel (the horizontal direction in FIG. 8-10 which is represented in FIG. 8 by an arrow marked with v_A, indicating the velocity of the vehicle). However, the arrangement and positions of the electric lines in FIG. 8-10 are chosen for illustration purposes only and do not correspond to the positions in embodiments of the invention which can be used in practice. Instead, the electric lines (also called: phase lines) of the receiving device 213 form coils as described above. The arrangement of electric lines 9, 10, 11 of the receiving device shown in FIGS. 9 and 10 just illustrates the fact that there are three phase lines in the example. Furthermore, the arrangement of electric lines 9, 10, 11 illustrates the outer dimensions of the effective area which is covered by the coils. This effective area is smaller than the outer dimensions of the receiving device 213 which are indicated by rectangle 308. For example, the electric lines 9, 10, 11 may be connected to each other so as to form a star point 122. Between the connections of the electric lines 9, 10, 11 which are shown left in FIGS. 9 and 10, voltages U1, U2, U3 (which are functions of time t) are induced by magnetic induction during operation of the receiving device.

A slab shaped body 211 made of ferrite or another ferromagnetic material extends in a plane above the plane of the electric lines of the receiving device 213 at a higher level. The top views of FIG. 9 and FIG. 10 show that the size of the body 211 may vary compared to the effective area. Preferably, the length of the body 211 in the direction of travel and the width in the direction perpendicular to the direction of travel and perpendicular to the central axes of the coils is at least as large as the effective area which is covered by the coils (FIG. 10) as opposed to the smaller size of the body 211 in FIG. 9. The advantage is that the coils are completely covered by the body 211 and, therefore, the interior of the vehicle above the body 211 is kept nearly free from the electromagnetic field produced by the coils and by the primary side conductor arrangement. On the other hand, the body 211 bundles the magnetic flux lines and therefore increases the efficiency of the magnetic coupling by induction between the primary side conductor arrangement and the receiving device of the vehicle. The magnetic coupling is symbolized by letter M in FIG. 9 and FIG. 10.

Figure 11:
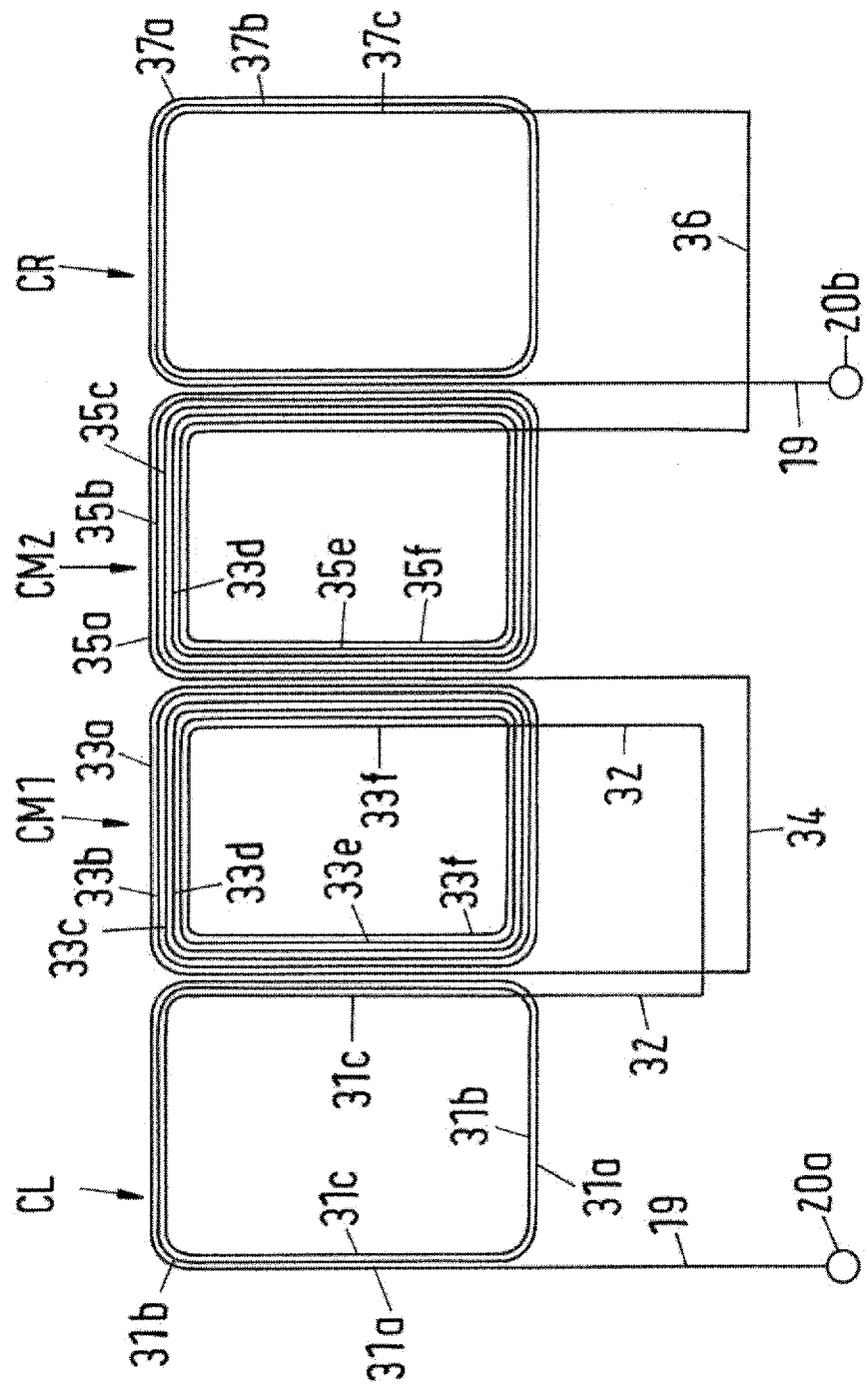

FIG. 11 shows a flat arrangement of coils CL, CM1, CM2, CR which forms a sequence of coils of a single phase line. Similarly to the arrangement shown in FIG. 1, the sequence of coils shown in FIG. 11 may be combined with two further sequences of coils of two other phase lines, wherein the different sequences of coils are shifted relative to each other in longitudinal direction (the horizontal direction in FIG. 1 and FIG. 11). All coils of the sequence shown in FIG. 11 are formed by a spirally wound phase line, so that the arrangement is particularly flat in the direction perpendicular to the image plane of FIG. 11.

The phase line 19 has two terminal connections 20a, 20b for connecting the phase line to external devices such as a rectifier and/or the on-board electric network of the vehicle shown in FIG. 6 and FIG. 7. Following the extension of the phase line 19 starting from terminal connection 20a, the phase line 19 performs three turns 31a, 31b, 31c to form the spiral first end coil CL. The inner turn 31c is connected to a first connection line 32 for connecting the first end coil CL with the first middle coil CM1.

Following the further extension of the phase line 19, the first connection line 32 is connected to the inner turn 33f of the first middle coil CM1, which has also several turns 33a-33f forming a spiral coil, but the number of turns of the first middle coil CM1 is six. The outer turn 33a of the first middle coil CM1 is connected via a second connection line 34 to the outer turn 35a of the second middle coil CM2. The second middle coil CM2 is configured in the same manner as the first middle coil CM1, i.e. it has also six turns 35a-35f.

The inner turn 35 of the second middle coil CM2 is connected via a third connection 36 to the inner turn 37c of the second end coil CR, which has three turns 37a, 37b, 37c and is configured in the same manner as the first end coil CL. The outer turn 37a of the second end coil CR is connected with the second terminal connection 20b of the phase line 19.

Spiral coils can also be used in other configurations of sequences of coils. For example, the number of coils per sequence may vary. In addition or alternatively, the number of turns in the individual coils may vary. For example, the distribution of turns may be 3-7-7-3 or 4-6-6-4 or 2-4-6-4-2 or 3-5-4-4-2.

It is not required for all cases that the two end coils have the same number of turns. In addition, it is not required that the two middle coils which neighbour the end coils have the same number of turns. Generally speaking, an optimization of the distribution of turns may result in any number of turns for the respective coil. However, in most cases, the number of turns of the end coils is smaller than the number of turns of at least one of the middle coils (or the only middle coil). In particular, the number of turns of the end coils is typically smaller than the number of turns of the neighboring middle coil.

The sequence of coils schematically shown in FIG. 11 can be modified to have five coils. In this case, a third middle coil CM3 may be inserted between the second middle coil CM2 and the right end coil CR. For example, third connection 36 may connect the second middle coil CM2 with the third middle coil CM3 and an additional connection may connect the third middle coil CM3 with terminal connection 20b of phase line 19. Any distribution of turns can be realized in this manner, no matter if there are two, three or more middle coils.

Figure 12:
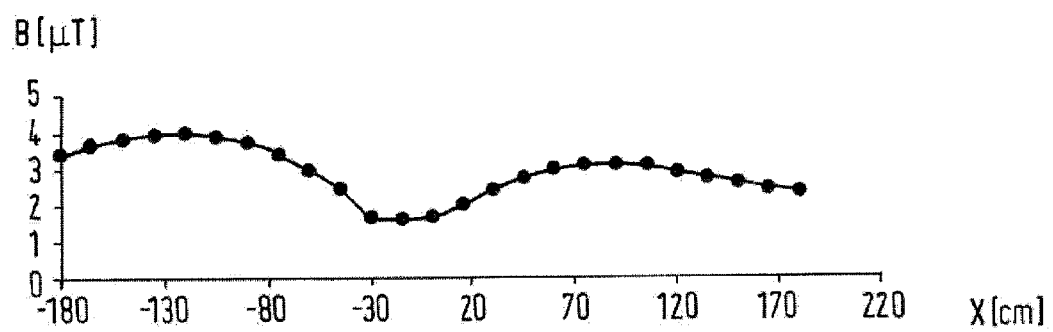

FIG. 12 shows a measured profile of the total field intensity of the magnetic field B along a straight line in parallel to the center line of a coil arrangement. For example, in the coil arrangement shown in FIG. 11, the center line would extend in the horizontal direction of the figure being equally distanced to the upper and lower sections of the turns shown in the figure, which extend in horizontal direction of the figure. In case of the measurement results shown in FIG. 12, the distance of the straight line is 1.4 m to the center line. On the horizontal axis in FIG. 12, the location X in lengthwise direction along the straight line is shown. The measurements were taken only sideways of the coils of the receiving device over a total length of 3.6 m. In particular, this is equal to the length of the coil arrangement.

The measured values are the result of the total field intensity B produced during operation of the receiving device. This means that the total field is produced by the primary side conductor arrangement which generates the electromagnetic field for energy transfer to the receiving device and by the receiving device itself. In the example shown, the width of the coil arrangement in the direction of the distance between the straight line and the center line is 1 m.

Figure 13:
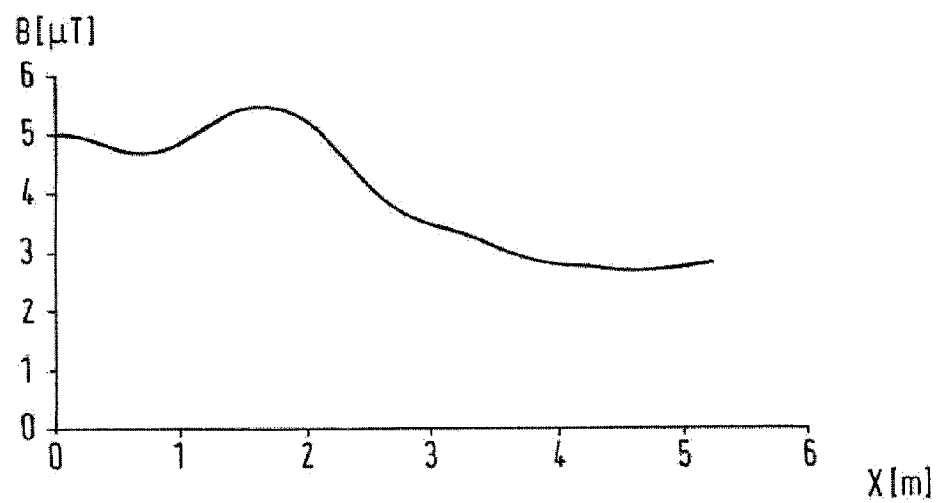

FIG. 13 shows a simulated dependency of the total field intensity B along the straight line for a similar, but different configuration of the primary side conductor arrangement. However, the principle results of the measurement shown in FIG. 12 and the simulation shown in FIG. 13 are the same: There is a maximum of the field intensity at one location of the straight line and the field intensity at other locations along the straight line is significantly smaller and is (in case of the measurements) only half as large as the maximum at some locations.

Figure 14:
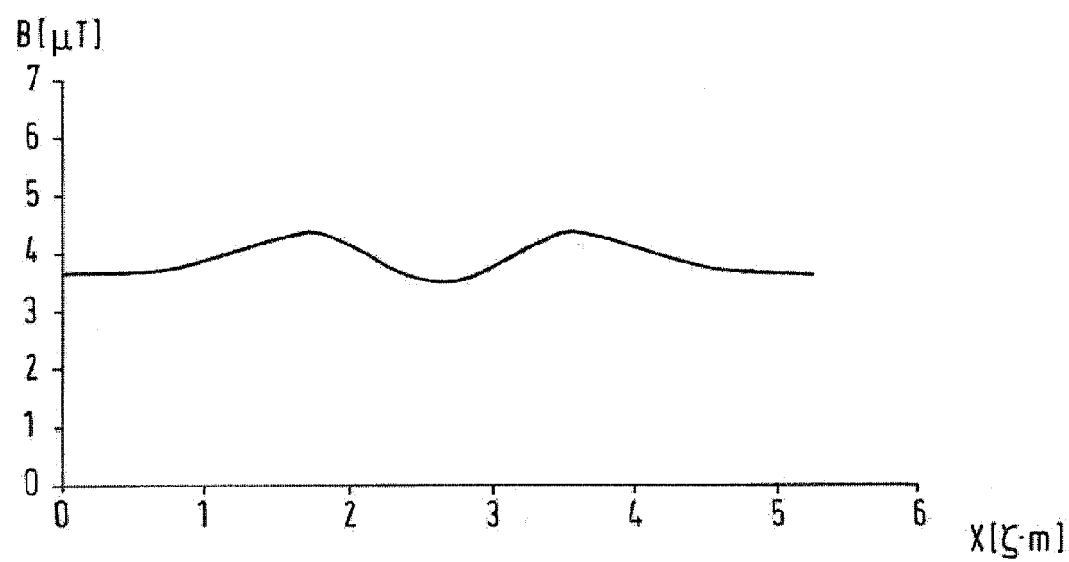

FIG. 14 shows a simulation result for the same situation as shown in FIG. 13, but for an optimized distribution of turns of the coil arrangement. The field intensity varies along the straight line by a small amount only.

The invention claimed is:

1. An arrangement for providing a vehicle with electric energy, the arrangement comprising a receiving device adapted to receive an alternating electromagnetic field and to produce an alternating electric current by magnetic induction, wherein the receiving device comprises at least one phase line, wherein in the case of a single phase line the phase line being adapted to carry a phase current of the alternating electric current and wherein in the case of a plurality of phase lines each phase line being adapted to carry a different phase current of a plurality of phase currents of the alternating electric current, wherein:
   each phase line forms at least three coils,
   each coil includes at least one turn of the phase line,
   the turn of any one of the coils including only one turn is turned around a central axis of the coil,
   the turns of any one of the coils including more than one turn are consecutive sections of the phase line turned around a central axis of the coil,
   the at least three coils of each phase line are located next to each other so as to form a sequence of coils which covers an effective area in a plane that extends perpendicularly to the central axes of the coils, so that there are a first and a second end coil at the opposite ends of the sequence and, in the case of three or more coils, at least one middle coil in between the end coils of the sequence,
   for at least one of the phase lines, the number of turns per coil of the sequence of coils differs, and
   each of the end coils has a smaller number of turns than the middle coil or middle coils.

2. The arrangement of claim 1, wherein the at least one of the phase lines comprises at least four coils, so that the sequence of coils comprises at least two middle coils, and wherein the ratio of the number of turns forming each of the end coils to the number of turns forming each of the middle coils next to the respective end coil is in the range of 0.4 to 0.6.

3. The arrangement of claim 1, wherein each of the coils of the at least one phase line covers an area of the same size as the other coils of the same sequence of coils within the plane that extends perpendicularly to the central axes of the coils.

4. The arrangement of claim 1, wherein the coils of the at least one phase line which are parts of the same sequence of coils are positioned shifted relative to each other—with respect to a longitudinal direction extending from the first end coil to the second end coil—by a constant first shift length, wherein the first shift length is equal to one half of a wave length of a pre-defined electromagnetic wave which is produced by the alternating electromagnetic field while propagating in the longitudinal direction during operation of the arrangement.

5. The arrangement of claim 1, wherein the coils of the at least one phase line which are parts of the same sequence of coils are positioned shifted relative to each other—with respect to a longitudinal direction extending from the first end coil to the second end coil—by a constant first shift length, wherein the different sequences of coils of the phase lines are positioned shifted relative to each other—with respect to a longitudinal direction extending from the first end coil to the second end coil of any of the sequences of coils—at a second shift length, wherein the second shift length is equal to an integer multiple of the first shift length divided by the number of phase lines.

6. A vehicle comprising the arrangement of claim 1, wherein the arrangement is located at the bottom of the vehicle, so that the central axes of the coils extend in a vertical direction, provided that the vehicle travels on a horizontal underground or horizontal track.

7. A system for transferring energy to a vehicle, wherein the system comprises a primary side electric conductor arrangement, which is arranged along a path of travel of the vehicle, wherein the primary side conductor arrangement is adapted to carry an alternating current which generates a respective alternating electromagnetic field and wherein the system comprises the arrangement of claim 1 as a secondary side arrangement for receiving the alternating electromagnetic field in order to produce an alternating electric current by magnetic induction.

8. The system of claim 7, wherein the coils of the at least one phase line which are parts of the same sequence of coils are shifted relative to each other—with respect to a longitudinal direction extending from the first end coil to the second end coil—by a constant first shift length, wherein the first shift length is equal to one half of a wave length of a pre-defined electromagnetic wave which is produced by the alternating electromagnetic field while propagating in the longitudinal direction during operation of the arrangement and wherein the primary side electric conductor arrangement is adapted to produce the pre-defined electromagnetic wave.

9. A method of manufacturing an arrangement for providing a vehicle with electric energy, including the steps of: manufacturing a receiving device of the arrangement which is adapted—during operation—to receive an alternating electromagnetic field and to produce an alternating electric current by magnetic induction, wherein the receiving device is equipped with a phase line or a plurality of phase lines, wherein in case of a single phase line the phase line is being adapted—during operation—to carry a phase current of the alternating electric current and wherein in case of a plurality of phase lines each phase line being adapted—during operation—to carry a different one of a plurality of phases of the alternating electric current, wherein:
at least three coils are formed by each phase line,
each coil is constituted by at least one turn of the phase line,
the turn of any one of the coils including only one turn is formed so as to turn around a central axis of the coil,
the turns of any one of the coils including more than one turn are formed as consecutive sections of the phase line so as to turn around a central axis of the coil,
the at least three coils of each phase line are located next to each other so as to form a sequence of coils which covers an effective area in a plane that extends perpendicularly to the central axes of the coils, so that there are a first and a second end coil at the opposite ends of the sequence and at least one middle coil in between the end coils of the sequence,
for at least one of the phase lines, the number of turns per coil of the sequence of coils differs, and
each of the end coils has a smaller number of turns than the middle coil or middle coils.

10. The method of claim 9, wherein the at least one of the phase lines is equipped with at least four coils, so that the sequence of coils comprises at least two middle coils, and wherein the ratio of the number of turns forming each of the end coils to the number of turns forming the middle coils next to the respective end coil is chosen to be in the range of 0.4 to 0.6.

11. The method of claim 9, wherein at least one measurement, simulation, calculation, or measurement, simulation, and calculation of a field intensity of an electromagnetic, electric or magnetic field produced by the arrangement or produced by a system, which includes the arrangement and further includes a primary side conductor arrangement for generating an electromagnetic field, is performed and based on a result of the measurement, simulation, calculation, or measurement, simulation, and calculation the number of turns of the coils of the at least one of the phase lines is varied and chosen for the arrangement to be used in practice.

12. A method of operating a vehicle comprising the steps of: using a receiving device which receives an alternating electromagnetic field and produces an alternating electric current by magnetic induction, wherein at least one phase line is used by the receiving device, wherein in the case of a single phase line the phase line carries a phase current of the alternating electric current and wherein in the case of a plurality of phase lines each phase line carries a different phase of a plurality of phases of the alternating electric current, wherein:
each phase line is operated using at least three coils,
in each coil the alternating electric current is carried by at least one turn of the phase line,
the turn of any one of the coils including only one turn is turned around a central axis of the coil,
the turns of any one of the coils including more than one turn are consecutive sections of the phase line turned around a central axis of the coil,
the at least three coils of each phase line are used as a sequence of coils which covers an effective area in a plane that extends perpendicularly to the central axes of the coils, so that there are a first and a second end coil at the opposite ends of the sequence and at least one middle coil in between the end coils of the sequence, and
in at least one of the phase lines, the phase current of the alternating electric current flows through coils having a different number of turns per coil within the sequence of coils, and
each of the end coils has a smaller number of turns than the middle coil or middle coils.

13. The method of claim 12, wherein the coils of the at least one phase line which are parts of the same sequence of coils are shifted at shifted positions—with respect to a longitudinal direction extending from the first end coil to the second end coil—by a constant first shift length, wherein the first shift length is equal to one half of a wave length of a pre-defined electromagnetic wave which is produced by the alternating electromagnetic field while propagating in the longitudinal direction.

\* \* \* \* \*

UNITED STATES PATENT AND TRADEMARK OFFICE
CERTIFICATE OF CORRECTION

PATENT NO.        : 9,517,697 B2
APPLICATION NO.   : 14/355968
DATED             : December 13, 2016
INVENTOR(S)       : Konrad Woronowicz et al.

Page 1 of 1

It is certified that error appears in the above-identified patent and that said Letters Patent is hereby corrected as shown below:

In the Claims

Column 18, Line 50, Claim 1, delete "axes" and insert -- axis --

Column 19, Line 2, Claim 3, delete "axes" and insert -- axis --

Column 19, Line 28, Claim 6, delete "axes" and insert -- axis --

Column 20, Line 9, Claim 9, delete "axes" and insert -- axis --

Column 20, Line 55, Claim 12, delete "axes" and insert -- axis --

Signed and Sealed this
Ninth Day of May, 2017

Michelle K. Lee
*Director of the United States Patent and Trademark Office*